United States Patent [19]

Mukae et al.

[11] Patent Number: 4,581,084
[45] Date of Patent: Apr. 8, 1986

[54] METHOD OF AND APPARATUS FOR TRANSFERRING BEAD CORES

[75] Inventors: Makito Mukae, Higashimurayama; Yusuke Araki, Kodaira, both of Japan

[73] Assignee: Bridgestone Tire Company Limited, Tokyo, Japan

[21] Appl. No.: 558,195

[22] Filed: Dec. 5, 1983

[30] Foreign Application Priority Data

Dec. 23, 1982 [JP] Japan ................. 57-231116

[51] Int. Cl.$^4$ ............................................. B29D 30/32
[52] U.S. Cl. ..................................... 156/131; 156/136; 156/344; 156/403
[58] Field of Search ...................... 156/131, 136, 110.1, 156/247, 344, 394.1, 403, 422, 460, 521

[56] References Cited

U.S. PATENT DOCUMENTS

| | | | |
|---|---|---|---|
| 2,902,083 | 9/1959 | White ................................. | 156/136 |
| 3,915,788 | 10/1975 | Hirata et al. ....................... | 156/403 |
| 3,982,989 | 9/1976 | Badenkov et al. ................. | 156/403 |

FOREIGN PATENT DOCUMENTS

| | | | |
|---|---|---|---|
| 1200520 | 9/1965 | Fed. Rep. of Germany ...... | 156/403 |
| 2361219 | 3/1978 | Fed. Rep. of Germany ...... | 156/136 |
| 4416536 | 7/1969 | Japan ................................. | 156/403 |
| 4523412 | 8/1970 | Japan ................................. | 156/403 |

*Primary Examiner*—Lois E. Boland
*Attorney, Agent, or Firm*—Cushman, Darby & Cushman

[57] ABSTRACT

A method of and an apparatus for separating a bead core from a plurality of looped bead cores arranged in the form of a tube with the adjacent bead cores endwise sticking to one another, wherein the tube of the bead cores are wrapped round a radially collapsible feed drum whereupon the bead feed unit is driven for movement from a first predetermined position to a second predetermined position in a first predetermined direction parallel with the center axis of the feed drum. The tube of the bead cores is then pressed on the feed drum toward one axial end of the feed drum until the foremost one of the bead cores on the feed drum departs from the feed drum. The foremost one of the bead cores is on a bead receiver unit positioned close to the axial end of the feed drum and thereafter the bead receiver unit is driven for movement in a second predetermined direction perpendicular to the first direction for thereby forcing the bead core received on the bead receiver unit to separate from the tube of the remaining bead cores on the feed drum.

4 Claims, 12 Drawing Figures

METHOD OF AND APPARATUS FOR TRANSFERRING BEAD CORES

FIELD OF THE INVENTION

The present invention relates in general to the manufacture of pneumatic tires and, particularly, to a method of separating a bead core from a plurality of looped bead cores arranged in the form of a tube with the adjacent bead cores endwise sticking to one another and further to a bead transfer apparatus adapted to carry out such a method.

BACKGROUND OF THE INVENTION

During manufacture of pneumatic tires, bead cores each to form part of a tire are supplied in succession to a tire building drum. For this purpose, the annular or looped bead cores preliminarily produced are wrapped on a bead feed drum. Each of the bead cores has a layer of unvalcanized rubber having a bundle of bead wires embedded therein and has a sticky external surface. The adjacent bead cores wrapped round the bead feed drum endwise stick to one another and thus form a single, apparently integral tube. Difficulties are encountered in separating a bead core from the tube of the bead cores thus integrated together and attempts have therefore been made to eliminate such difficulties. Examples of such attempts are disclosed in Japanese Pat. Publications No. 45-23412 and No. 51-16074. In the prior-art method taught in Japanese Pat. Publication No. 45-23412, the bead cores forming such a tube are separated from each other by the use of a blade adapted to cut the junction between adjacent bead cores. Problems have however been encountered in this method in that it is difficult to have the blade interposed correctly between the adjacent bead cores so that the bead cores separated from each other may be severed or otherwise damaged and the blade per se may be bent, broken or otherwise damaged. On the other hand, the method proposed in Japanese Pat. Publication No. 51-16074 is such that the axially outermost one of the bead cores forming a tube is retained to one retaining means and the tube of the remaining bead cores is retained to another retaining means and the bead core retained to the former retaining means is axially forced to depart from the tube of the remaining bead cores. This prior-art method has drawbacks in that a relatively large force is required to axially separate one bead core from the remaining bead cores and that the bead core may be seriously deformed when being separated from the remaining bead cores. An object of the present invention is to provide a method of easily separating a bead core from the tube of bead cores endwise sticking to one another. Another object of the present invention is to provide a bead transfer apparatus adapted to put such a method into practice.

SUMMARY OF THE INVENTION

In accordance with one outstanding aspect the present invention, there is provided a method of separating a bead core from a plurality of looped bead cores arranged in the form of a tube with the adjacent bead cores endwise sticking to one another, comprising wrapping the tube of the bead cores on a generally cylindrical feed drum which is radially collapsible about the center axis thereof, driving the bead feed unit for movement from a first predetermined position to a second predetermined position in a first predetermined direction parallel with the center axis of the feed drum, pressing the tube of the bead cores on the feed drum toward one axial end of the feed drum until the foremost one of the bead cores on the feed drum departs from the feed drum, receiving the foremost one of the bead cores on a bead receiver unit positioned close to the axial end of the feed drum, driving the bead receiver unit for movement in a second predetermined direction perpendicular to the first direction for thereby forcing the bead core received on the bead receiver unit to separate from the tube of the remaining bead cores on the feed drum.

In accordance with another outstanding aspect of the present invention, there is provided a bead transfer apparatus, comprising a bead feed unit comprising a generally cylindrical feed drum which is radially collapsible about the center axis thereof and which is adapted to have wrapped thereon a plurality of looped bead cores each having a sticky external surface, the bead cores being to be wrapped on the feed drum in a tubular form with the adjacent bead cores endwise sticking to one another, the bead feed unit being movable in its entirety between first and second predetermined positions in a first predetermined direction parallel with the center axis of the feed drum, a bead receiver unit to which the bead cores are to be transferred one by one from the feed drum, the bead receiver unit being movable to and from a predetermined position in a second predetermined direction which is perpendicular to first predetermined direction, the bead feed unit being remote from the bead receiver unit in the predetermined position thereof when held in the first predetermined position thereof and being close to the bead receiver unit in the predetermined position thereof when held in the second predetermined position thereof, the bead feed unit further comprising bead pressing means operative to press the tube of the bead cores on the feed drum toward the bead receiver unit in a direction parallel with the center axis of the feed drum when the bead feed unit is held in the second predetermined position thereof and the bead receiver unit is held in the predetermined position thereof, the bead receiver unit comprising bead take-up means operative to receive a bead core from the feed drum when the tube of the bead cores on the feed drum is pressed to move on the feed drum toward the bead receiver unit by the bead pressing means, drive means operative to drive the bead receiver unit for movement from the predetermined position thereof so that the bead core transferred from the feed drum to the bead take-up means is forced to separate from the tube of the remaining bead cores on the feed drum. The bead receiver unit may further comprise at least one annular structure formed with a plurality of radial guide slots extending in radial directions of the annular structure, the center axis of the annular structure being aligned with the center axis of the feed drum when the bead receiver unit is held in the predetermined position thereof, the bead take-up means comprising bead take-up elements which are respectively movable in and along the radial guide slots and which are operative to receive a bead core from the feed drum when moved to the radially outermost ends of the slots.

BRIEF DESCRIPTION OF THE DRAWINGS

The features and advantages of a method and a bead transfer apparatus according to the present invention will be more clearly appreciated from the following description taken in conjunction with the accompanying drawings in which like reference numerals designate similar assemblies, units, members and elements and in which.

DESCRIPTION OF THE PREFERRED EMBODIMENT

Figure 1:
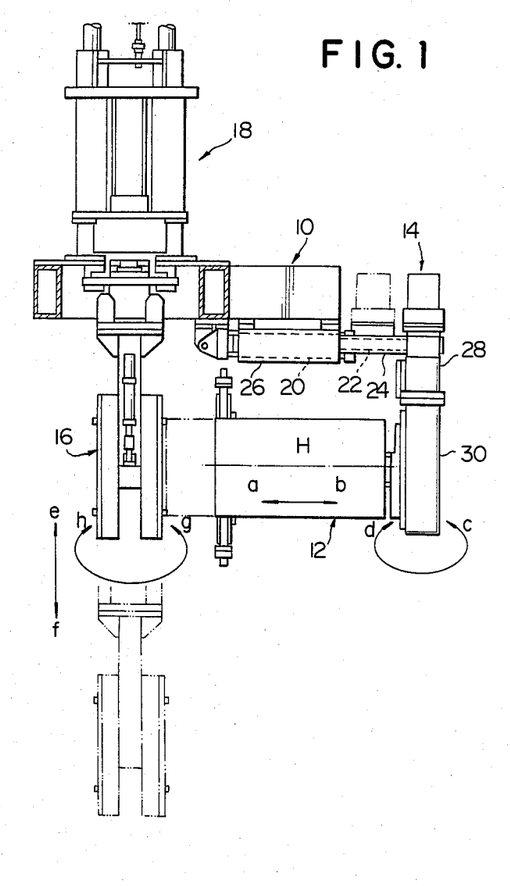
FIG. 1 is a front elevation view showing the general construction and arrangement of a bead transfer apparatus embodying the present invention.

Referring first to FIG. 1 of the drawings, a bead transfer apparatus embodying the present invention largely comprises a stationary support structure 10, a bead feed unit 12, a coupling unit 14, a bead receiver unit 16, and a drive unit 18. The stationary support structure 10 has supported thereon a fluid-operated power cylinder 20 comprising a cylinder body fixedly attached to the stationary support structure 10, and a piston rod 22 projecting from the cylinder body. The piston rod 22 is axially movable in, for example, a horizontal direction as shown with respect to the cylinder body and accordingly to the stationary support structure 10. The stationary support structure 10 includes an elongated guide member 24 on and along which the piston rod 22 of the power cylinder 20 is to move, and a bearing casing 26 having the guide member 24 supported thereon. The bead feed unit 12 is positioned below the support structure 10 and has a horizontal center axis H parallel with the directions of movement of the piston rod 22 of the power cylinder 20. The coupling unit 14 has the bead feed unit 12 operatively coupled to the piston rod 22 of the power cylinder 20 and comprises an upper body section 28, and a lower coupling section 30. The upper body section 28 is connected to the piston rod 22 of the power cylinder 20 so that the coupling unit 14 as a whole is movable with the piston rod 22 between a first predetermined position indicated by full lines and a second predetermined position partly indicated by phantom lines. Accordingly, the bead feed unit 12 as a whole is movable with the coupling unit 14 in opposite directions indicated by arrows a and b between a first or rest position indicated by full lines and a second or operative position indicated by phantom lines. The lower coupling section 30 is connected to or engaged with the body section 28 in such a manner as to be rotatable with respect to the body section 28 through a predetermined angle in opposite directions about a vertical axis as indicated by arrows c and d. The axis of rotation of the coupling section 30 is herein assumed to be perpendicular to the direction of movement of the piston rod 22 of the power cylinder 20. The bead feed unit 12 as a whole is, thus, not only movable with the coupling unit 14 in opposite directions parallel with the directions of movement of the piston rod 22 of the power cylinder 20 but is rotatable about the axis of rotation of the coupling section 30. The construction of the coupling unit 14 per se is rather immaterial to the understanding of the gist of the present invention and may be readily designed as desired by those skilled in the art. The detailed construction and arrangement of such a coupling unit 14 is for these reasons not herein shown and described. On the other hand, the bead receiver unit 16 is positioned on the opposite side of the bead feed unit 12 to the lower coupling section 30 of the coupling unit 14 and is movable upwardly and downwardly with respect to the bead feed unit 12 as indicated by arrows e and f, respectively, and is driven for such movement by means of the drive unit 18. The drive unit 18 is positioned above the bead receiver unit 16 and is supported by the stationary support structure 10 in a suitable manner. As will be described in more detail, the bead receiver unit 16 as a whole is not only movable upwardly and downwardly but is rotatable with respect to the bead feed unit 12 through, for example, 180 degrees about a vertical axis perpendicular to the axis of rotation H of the bead feed unit 12 as indicated by arrows g and h. The construction of the drive unit 18 per se is also rather immaterial to the understanding of the gist of the present invention and may be designed as desired. The detailed construction and arrangement of the drive unit 18 is for these reasons not herein shown and described. The bead feed unit 12 as a whole is horizontally movable with respect to the bead receiver unit 16 between a first predetermined position remote from the bead receiver unit 16 as indicated by full lines and a second predetermined position close to the drive unit 18 as indicated by phantom lines. Likewise, the bead receiver unit 16 as a whole is vertically movable with respect to the bead feed unit 12 between a predetermined uppermost position adjacent to the bead feed unit 12 as indicated by full lines and a predetermined lowermost position indicated by phantom lines.

Figure 2:
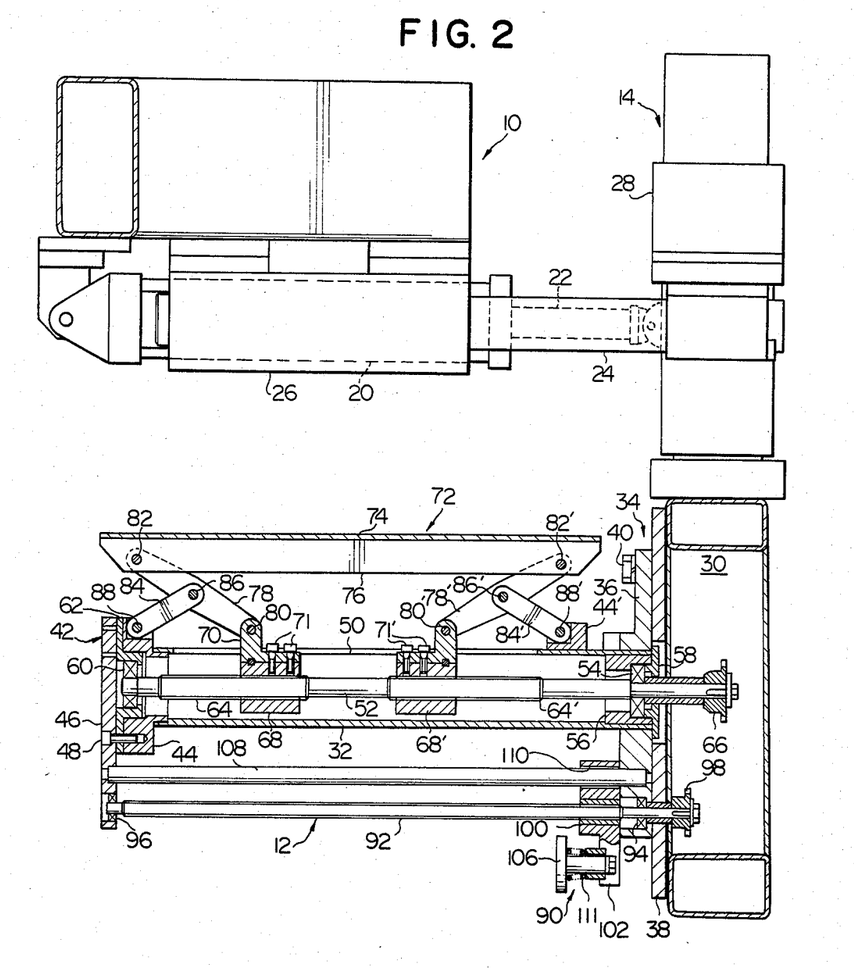
FIG. 2 is a front elevation view showing, to an enlarged scale and partly in cross section, a stationary support structure, a bead feed unit and a coupling unit forming part of the bead transfer apparatus shown in FIG. 1.

Turning to FIG. 2 of the drawings, the bead feed unit 12 comprises a cylindrical, hollow support shaft 32 longitudinally extending in parallel with the directions of movement of the piston rod 22 of the above described power cylinder 20. The hollow support shaft 32 has a center axis on the above mentioned center axis H (FIG. 1) of the bead feed unit 12 and is securely attached at one end thereof to the lower coupling section 30 of the coupling unit 14 by means of a bracket assembly 34. The bracket assembly 34 comprises an annular bracket member 36 securely attached to an axial end portion of the support shaft 32 and through a strap plate 38 to the lower coupling section 30 of the coupling unit 14 by suitable fastening means such as bolts one of which is shown at 40. The hollow support shaft 32 has carried at its end opposite to the bracket assembly 34 an end plate assembly 42 which comprises an annular bracket member 44 which is securely attached to a leading end portion of the support shaft 32, and an end plate 46 which is securely connected to the bracket member 44 by suitable fastening means such as screws or studs one of which is shown at 48 in FIG. 2. The hollow support shaft 32 thus arranged is formed with three axially elongated slots 50 which are disposed at the angular intervals of 120 degrees about the center axis of the hollow support shaft 32.

The bead feed unit 12 shown in FIG. 2 further comprises an elongated feed shaft 52 which extends in the hollow support shaft 32 in such a manner as to have its center axis on the center axis of the support shaft 32. The feed shaft 52 has an axial portion journaled in a bearing 54 received in a sleeve 56 securely fitted in an axial end portion of the support shaft 32 and held in axial position by means of a bearing retainer 58 securely attached to an end face of the sleeve 56 as shown. The feed shaft 52 further has its leading end portion journaled in a bearing 60 received in a bearing holder 62 having a flange portion securely interposed between the above mentioned bracket member 44 and end plate 46 by means of the screws or studs 48. The feed shaft 52 is thus rotatable about the center axis thereof with respect to the support shaft 32 and has two axial screw portions 64 and 64' formed with helical threads. The threads of one of these axial screw portions 64 and 64' are cut with a left-hand helix and the threads of the other of the screw portions 64 and 64' are cut with a right-hand helix. The feed shaft 52 thus arranged axially projects from the support shaft 32 into a hollow space in the lower coupling section 30 of the coupling unit 14 and has a sprocket wheel 66 securely carried on its axial end portion within the coupling section 30. Though not shown in the drawings, the sprocket wheel 66 forms part of a chain and sprocket arrangement which further comprises a driving sprocket wheel and an endless chain passed between the driving sprocket wheel and the sprocket wheel 66 thus carried on the feed shaft 52. The driving sprocket wheel is driven for rotation by suitable drive means such as a reversible torque motor (not shown) so that the sprocket wheel 66 and accordingly the feed shaft 52 are driven for rotation in either direction about the center axis of the feed shaft 52.

The feed shaft 52 has carried thereon two internally threaded, generally cylindrical nut blocks 68 and 68' which engage the above mentioned axial screw portions 64 and 64', respectively, of the shaft 52. The nut blocks 68 and 68' are held against rotation on the feed shaft 52 as will be understood as the description proceeds and are, for this reason, caused to move toward or away from each other on and along the screw portions 64 and 64', respectively, of the feed shaft 52 when the feed shaft 52 is driven for rotation in either direction about the center axis thereof by means of the above described chain and sprocket arrangement. One nut block 68 has securely mounted thereon three radial projections or lug members 70 which project radially outwardly from the nut block 68 and which are disposed at the angular intervals of 120 degrees about the center axis of the feed shaft 52. The other nut block 68' likewise has securely mounted thereon three radial projections or lug members 70' projecting radially outwardly from the nut block 68' and disposed at the angular intervals of 120 degrees about the center axis of the feed shaft 52. The lug members 70 on the nut block 66 are axially aligned with the lug members 70' on the nut block 66'. Furthermore, the lug members 70 and 70' on the nut blocks 66 and 66' project radially outwardly from the hollow support shaft 32 through the axial slots 50, respectively, in the support shaft 32. The lug members 68 and 68' are herein assumed to be constructed separately of the nut blocks 68 and 68' and secured to the nut blocks 68 and 68' by suitable fastening means such as screws or studs 71 and 71', respectively, as shown but may be integral with the nut blocks 68 and 68', respectively, if desired.

Figure 3:
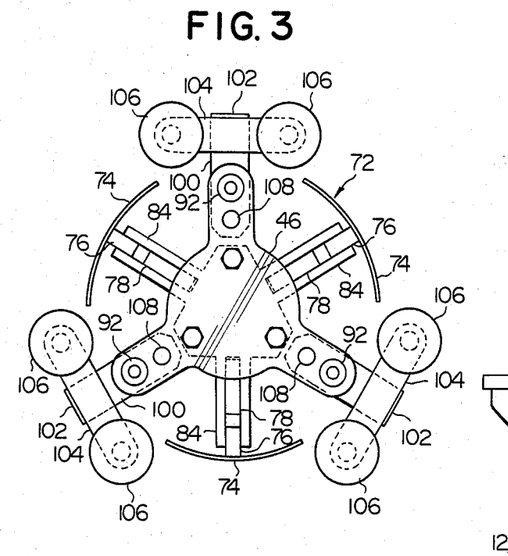
FIG. 3 is an end view of the bead feed unit as viewed from a plane indicated by line III—III in FIG. 2.

The bead feed unit 12 of the bead transfer apparatus embodying the present invention further comprises a generally cylindrical, collapsible feed drum 72 coaxially surrounding the support shaft 32 and having a predetermined axial length approximately equal to the length of the hollow support shaft 32. As will be better seen from FIG. 3 of the drawings, the feed drum 72 comprises similarly shaped, three separate drum segments 74 equiangularly spaced apart from one another about the center axis of the above described feed shaft 52 and each having arcuate cross sections. Each of these drum segments 74 has on its curved inner face a rib portion 76 longitudinally extending between the axial ends of the drum segment 74 in parallel with the center axis of the hollow support shaft 32. The respective rib portions 76 thus formed on the individual drum segments 74 are radially aligned with the axial slots 50, respectively, in the hollow support shaft 32 and accordingly with the lug members 70 and 71', respectively, on each of the nut blocks 68 and 68'. Referring concurrently to FIGS. 2 and 3, the collapsible feed drum 72 further comprises three link assemblies respectively associated with the lug members 70 on the nut block 68 and three link assemblies respectively associated with the lug members 70' on the nut block 68'. As will be better seen from FIG. 2, the link assembly associated with each of the lug members 70 on the nut block 68 comprises a first link member 78 pivotally connected at one end thereof to the lug member 70 by a pivot pin 80 and at the other end thereof to the rib portion 76 of one of the drum segments 74 by a pivot pin 82 located adjacent one longitudinal end of the rib portion 76, and a second link member 84 pivotally connected at one end thereof to an intermediate portion of the first link member 78 by a pivot pin 86 and at the other end thereof to the bracket member 44 of the end plate assembly 42 by a pivot pin 88. Likewise, the link assembly associated with each of the lug members 70' on the nut block 68' comprises a first link member 78' pivotally connected at one end thereof to the lug member 70' by a pivot pin 80' and at the other end thereof to the rib portion 76' of one of the drum segments 74 by a pivot pin 82', and a second link member 84' pivotally connected at one end thereof to an intermediate portion of the first link member 78' by a pivot pin 86' and at the other end thereof to a bracket member 44' on the hollow support shaft 32 by means of a pivot pin 88'. The bracket member 44' is securely mounted on the outer peripheral surface of an axial portion of the support shaft 32 and is located adjacent the bracket assembly 34. The link assemblies associated with the lug members 70 on the nut block 68 are constructed and arranged similarly to the link assemblies associated with the lug members 70' on the nut block 68'. The individual drum segments 74 of the feed drum 72 are thus movable radially toward and away from the hollow support shaft 32 as the first and second link members 78 and 84 associated with the lug members 70 on the nut block 68 and the first and second link members 78' and 84' associated with the lug members 70' on the nut block 68' are caused to turn on planes which pass through the center axis of the feed shaft 52.

The link members of each of the above described link assemblies are caused to turn toward or away from the center axis of the feed shaft 52 as the feed shaft 52 is driven for rotation in either direction about the center axis thereof and as a consequence the nut blocks 68 and 68' are caused to move toward or away from each other on the feed shaft 52. As the drum segments 74 are thus caused to radially move toward or away from the center axis of the feed shaft 52, the feed drum 72 as a whole is caused to collapse or expand coaxially around the hollow support shaft 32. More particularly, the feed drum 72 is caused to radially collapse around the support shaft 32 as the nut blocks 68 and 68' are driven to move toward each other and as a consequence the link members 78, 78', 84 and 84 are caused to turn toward the support shaft 32. On the contrary, the feed drum 72 is caused to radially expand around the support shaft 32 as the link members 78, 78', 84 and 84 are caused to turn radially away from the support shaft 32 with the nut blocks 68 and 68' driven to move away from each other. When the nut blocks 68 and 68' are driven to move to positions closest to each other on the feed shaft 52, the feed drum 72 is thus expanded to a predetermined maximum diameter about the center axis of the feed shaft 52.

The bead feed unit 12 shown in FIGS. 2 and 3 further comprises three bead pressing assemblies 90 which are equiangularly spaced apart from one another about the center axis of the feed shaft 52. Each of these bead pressing assemblies 90 includes a screw shaft 92 having an axial portion journaled in a bearing 94 received in the bracket member 36 of the bracket assembly 34 and an opposite axial end portion journaled in a bearing 96 received in the end plate 46 of the end plate assembly 42 as shown. The screw shaft 92 is thus rotatable about the center axis thereof with respect to the hollow support shaft 32 and is formed with helical left-hand or right-hand helix threads between the bracket member 36 and the end plate 46. The screw shaft 92 axially projects from the bracket member 36 and strap plate 38 into the hollow space in the lower coupling section 30 of the coupling unit 14 and has a sprocket wheel 98 securely carried on its axial end portion within the coupling section 30. Though not shown in the drawings, the respective sprocket wheels 98 of the three bead pressing assemblies 90 form part of a chain and sprocket arrangement which further comprises a driving sprocket wheel and an endless chain passed between the driving sprocket wheel and the respective sprocket wheels 98 carried on the screw shafts 92 of the bead pressing assemblies 90. The driving sprocket wheel is driven for rotation by suitable drive means such as a reversible torque motor (not shown) so that the sprocket wheel 98 and accordingly the screw shaft 92 are driven for rotation in either direction about the center axis of the screw shaft 92. As will be better seen from FIG. 3, the three screw shafts 92 are equiangularly spaced apart through 120 degrees from one another about the center axis of the feed drum 72 and accordingly about the center axis of the above described feed shaft 52, each of the screw shafts 92 being thus located intermediate between the adjacent two of the drum segments 74.

Each of the three screw shafts 92 arranged as above described has carried thereon an internally threaded nut block 100 which engages the screw shaft 92. The nut block 100 is held against rotation on the screw shaft 92 as will be understood as the description proceeds and is, for this reason, caused to move on and along the screw shaft 92 between the bracket member 36 and the end plate 46, viz., between positions closest to and remotest from the bead receiver unit 16 (FIG. 1) when the screw shaft 92 is driven for rotation in either direction about the center axis thereof by means of the above described chain and sprocket arrangement. The nut block 100 has a radial projection or lug portion 102 which projects radially away from the center axis of the feed shaft 52 through each of the gaps between adjacent two of the drum segments 74 of the feed drum 72 as will be seen from FIG. 3. The lug portion 102 of the nut block 100 has fixedly mounted thereon an arm member 104 having a pair of arm portions extending perpendicularly in opposite directions from the lug portion 102. A pair of disc-shaped bead pressing members 106 are carried on these arm portions of the arm member 104. The measurements of the nut block 100 and the arm member 104 are such that the bead pressing members 106 thus carried on the arm member 104 are located outside the gap between the adjacent two of the drum segments 74 and on a cylindrical plane defined by the arcuately curved outer faces of the individual drum segments 74 when the feed drum 72 is radially expanded to the previously mentioned predetermined maximum diameter about the center axis of the feed shaft 52. A total of three pairs of bead pressing members 106 are thus provided around the feed drum 72 as will be seen from FIG. 3. If desired, the movement of the nut block 100 on each of the screw shafts 92 may be guided by a guide shaft 108 extending in parallel with the associated screw shaft 92 and securely connected at its opposite ends to the bracket member 36 and the end plate 46 as shown in FIG. 2. In this instance, the nut block 100 is formed with a cylindrical aperture 110 and is slidably received on this guide shaft 108 through this aperture. Furthermore, each of the above described bead pressing members 106 may be mounted on the nut block 100 in such a manner as to be movable in parallel with the screw shaft 92. In this instance, the bead pressing member 106 is provided with a suitable spring 111 urging the bead pressing member 106 toward the end plate 46 as shown in FIG. 2. The feed drum 72 constructed and arranged as hereinbefore described is movable in its entirety toward and away from the bead receiver unit 16 when the piston rod 22 of the power cylinder 20 described with reference to FIG. 1 is caused to retract into or project from the cylinder body.

Figure 4:
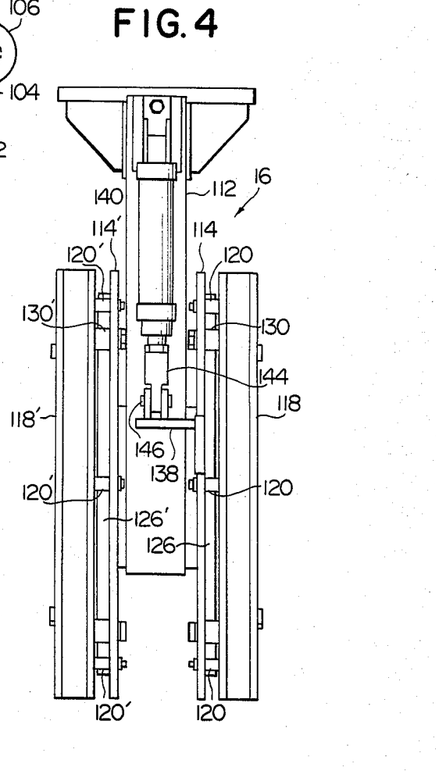
FIG. 4 is a front elevation view showing, also to an enlarged scale, a bead receiver unit forming part of the bead transfer apparatus shown in FIG. 1.
Figure 5:
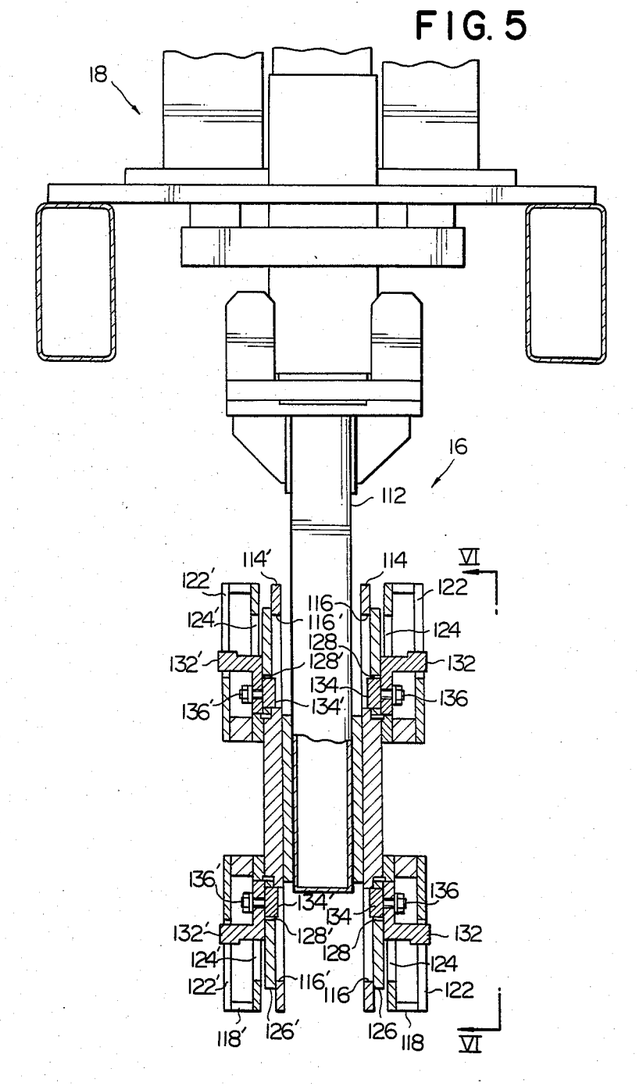
FIG. 5 is a front elevation view showing, to a further enlarged scale and partly in vertical section, the bead receiver unit shown in FIG. 4.
Figure 6:
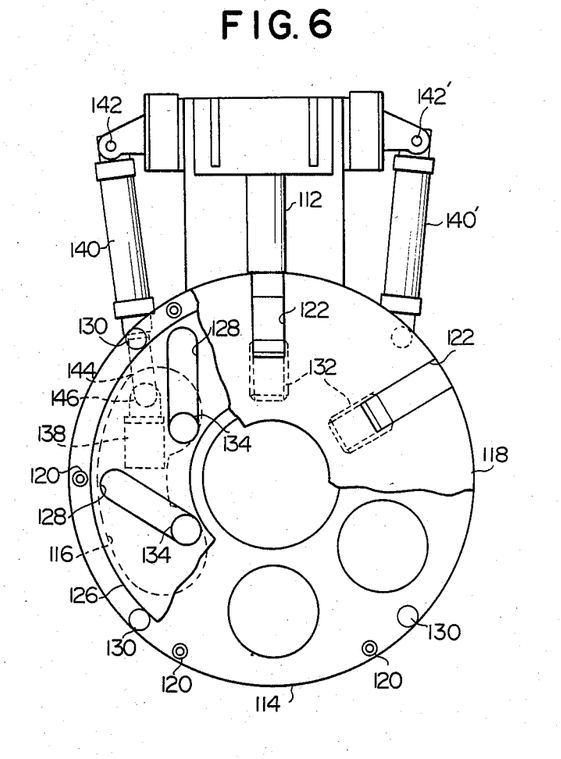
FIG. 6 is an end view of the bead receiver unit as viewed from a plane indicated by line VI—VI in FIG. 5.

Referring now to FIGS. 4, 5 and 6 of the drawings, the bead receiver unit 16 of the bead transfer apparatus embodying the present invention comprises a vertical support column 112 operatively connected to and extending downwardly from the drive unit 18. The support column 112 is movable upwardly and downwardly with respect to the above described bead feed unit 12 so that the bead receiver unit 16 as a whole is movable upwardly to and downwardly from a predetermined uppermost position with respect to the bead feed unit 12 as indicated by the arrows e and f, respectively, in FIG. 1. The support column 112 is further rotatable through 180 degrees in opposite directions about a vertical axis fixed with respect to the stationary support structure 10 supporting the drive unit 18 so that the bead receiver unit 16 as a whole is rotatable as indicated by the arrows g and h in FIG. 1. The construction of the drive unit 18 to drive the support column in these manners is rather immaterial to the understanding of the gist of the present invention and may be readily designed as desired by those skilled in the art. The detailed construction and arrangement of such a coupling unit 14 is for these reasons not herein shown and described.

The support column 112 has a pair of opposite side walls one of which is to face the bead feed unit 12 when the support column 112 has a predetermined position about the axis of rotation of the column 112 and the other of which is to face the bead feed unit 12 when the support column 112 is turned through 180 degrees from the particular position about the axis of rotation of the column 112. Circular disc members 114 and 114' are fixedly attached to these side walls of the vertical support column 112. As will be best seen from FIG. 6, the disc member 114 is formed with at least one generally arcuate slot 116 which extends in an arc with a suitable length along a portion of the perimeter of the disc member 114. The other disc member 114' is also formed with such a slot 116' as shown in FIG. 5. A hollow, annular casing 118 is securely attached to the outer face of the disc member 114 through a suitable number of spacer elements 120 in such a manner that the respective center axes of the disc member 114 and the annular casing 118 are aligned with each other. The spacer elements 120 are mounted on the disc member 114 and are arranged along the outer perimeter of the disc member 114 as will be seen from FIG. 6. The annular casing 118 has inner and outer side walls and has formed in the outer side plate or wall a plurality of elongated radial guide slots 122 each extending radially of the casing 118 from the outer perimeter toward the inner perimeter of the casing 118 as will be best seen from FIG. 6. These radial guide slots 122 are disposed at equal angular intervals about the center axis of the casing 118 and are open at the outer perimeter of the outer side wall of the casing 118. In the embodiment herein shown, it is assumed that six such slots are formed in the annular casing 118 and thus the guide slots 120 are disposed at the angular intervals of 30 degrees about the center axis of the casing 118. To the outer face of the other disc member 114' is also securely attached an annular casing 118' through spacer elements 120'. The annular casing 118' is constructed similarly to the above described annular casing 118 and has elongated radial guide slots 122' formed in the outer side wall thereof as shown in FIG. 5. As shown in FIG. 5, the inner side walls of the annular casings 118' and 118 are also formed with radial guide slots 124 and 124' which are in registry with the radial guide slots 122 and 122', respectively, in the outer walls of the casings 118 and 118'. The radial guide slots 124 and 124' thus formed in the inner side walls of the annular casings 118 and 118' radially outwardly terminate in short of the outer perimeters of the side walls. The disc members 114 and 114' and the annular casings 118 and 118' have equal diameters which are, preferably, approximately equal to the previously mentioned maximum diameter of the feed drum 72 of the bead feed unit 12. The respective center axes of the disc members 114 and 114' and the annular casings 118 and 118' are aligned with each other and, when the bead receiver unit 16 assumes the above mentioned predetermined uppermost position, further with the center axis of the feed shaft 52 of the feed drum 72. The inner side walls of the annular casings 118 and 118' are axially spaced apart from the outer faces of the disc members 114 and 114' by means of the above mentioned spacer elements 120 and 120', respectively, so that open axial spaces are formed between the disc member 114 and the annular casing 118 and between the disc member 114' and the annular casing 118' as will be best seen from FIG. 4.

An annular cam member 126 is provided in the axial space thus formed between the disc member 114 and the annular casing 118 and, likewise, an annular cam member 126' is provided in the axial space formed between the disc member 114' and the annular casing 118'. The center axes of these annular cam members 126 and 126' are aligned with the respective center axes of the disc members 114 and 114' and the annular casings 118 and 118'. The cam member 126 is formed with a plurality of guide slots 128 which are equal in number to the radial guide slots 122 in the outer wall of the annular casing 118 and which are disposed at equal angular intervals about the center axis of the cam member 126. Similarly, the cam member 126' is formed with a plurality of guide slots 128' which are equal in number to the radial guide slots 122' in the outer wall of the annular casing 118' and which are disposed at equal angular intervals about the center axis of the cam member 126' Each of the guide slots 128 and 128' in the cam members 126 and 126', respectively, is elongated radially of the cam member and is skewed from a radial direction of the cam member as will be seen from FIG. 6. The annular cam members 126 and 126' have outside diameters which are, preferably, approximately equal to the diameter of the disc members 114 and 114' and the outside diameters of the annular casings 118 and 118' and accordingly to the maximum diameter of the feed drum 72 of the bead feed unit 12. In association with the annular cam members 126 and 126' thus constructed and arranged are provided a set of retaining rollers 130 and a set of retaining rollers 130', respectively. The retaining rollers 130 associated with the annular cam member 126 are also provided in the axial space between the disc member 114 and the annular casing 118 and are held in rollable contact with the outer peripheral surface of the cam member 126. Likewise, the retaining rollers 130' associated with the annular cam member 126' are provided in the axial space between the disc member 114' and the annular casing 118' and are held in rollable contact with the outer peripheral surface of the cam member 126'. The retaining rollers 130 are rotatably mounted on pins secured to the disc member 114 and located adjacent the outer perimeter of the disc member 114 and, similarly, the retaining rollers 130' are rotatably mounted on pins secured to the disc member 114' and located adjacent the outer perimeter of the disc member 114', as will be seen from FIGS. 4 and 6. The annular cam members 126 and 126' are thus retained in coaxial positions with respect to the disc members 114 and 114' and annular casings 118 and 118' by means of the retaining rollers 130 and 130', respectively.

The bead receiver unit 16 of the bead transfer apparatus embodying the present invention further comprises a plurality of bead take-up elements 132 carried on the annular casing 118 and a plurality of bead take-up elements 132' carried on the annular casing 118'. Each of these bead take-up elements 132 and 132' carried on the annular casing 118 has a generally L-shaped section radially of each of the annular casings 118 and 118' as will be seen from FIG. 5. Thus, each of the bead take-up elements 132 consists of a radial slider portion received in and movable along each of the radial guide slots 124 in the inner side wall of the casing 118 and an axial lug portion projecting from the radially outer end of the radial slider portion into each of the radial guide slots 122 in the outer side wall of the casing 118. Likewise, each of the bead take-up elements 132' carried on the annular casing 118' consists of a radial slider portion received in and movable along each of the radial guide slots 124' in the inner side wall of the casing 118' and an axial lug portion projecting the radially outer end of the radial slider portion into each of the radial guide slots 122' in the outer side wall of the casing 118'.

Each of the bead take-up elements 132 has a cam follower roller 134 rotatably carried on a bolt 136 secured to the radial slider portion of the take-up element 132 and, similarly, each of the bead take-up elements 132' has a cam follower roller 134' rotatably carried on a bolt 136' secured to the radial slider portion of the take-up element 132'. The cam follower rollers 134 thus carried on the individual bead take-up elements 132 are located in the skewed radial guide slots 128 in the annular cam member 126, and the cam follower rollers 134' carried on the individual bead take-up elements 132' are located in the skewed radial guide slots 128' in the annular cam member 126'. When the annular cam member 126 is driven to turn in either direction about the center axis thereof, the cam follower rollers 134 engaging the cam member 126 through the skewed radial guide slots 128 are forced to move radially inwardly or outwardly through the guide slots 128 so that the bead take-up elements 132 carrying the rollers 134 are caused to move radially inwardly or outwardly through the radial guide slots 122 and 124 in the annular casing 118. Likewise, the cam follower rollers 134' engaging the annular cam member 126' through the skewed radial guide slots 128' are forced to move radially inwardly or outwardly through the guide slots 128' so that the bead take-up elements 132' carrying the rollers 134' are caused to move radially inwardly or outwardly through the radial guide slots 122' and 124' in the annular casing 118' when the annular cam member 126' is driven to turn in either direction about the center axis thereof.

Each of the annular cam members 126 and 126' has fixedly attached thereto a bracket member 138 which has a lug portion projecting into the axial free space formed between the two disc members 114 and 114' through each of the previously mentioned arcuate slots 116 and 116' in the disc members 114 and 114'. A fluid-operated power cylinder 140 has a cylinder body pivotally connected at one end thereof to a bracket member on the previously mentioned vertical support column 112 by means of a pivot pin 142, and a piston rod 144 pivotally connected at its leading end to the above mentioned bracket member 138 by means of a pivot pin 146, as shown in FIGS. 4 and 6. A similar fluid-operated power cylinder 140' is provided which has a cylinder body pivotally connected at one end thereof to a bracket member on the vertical support column 112 by means of a pivot pin 142', and a piston rod (not shown) pivotally connected at its leading end to the bracket member on the disc member 114'.

Description will be hereinafter made regarding the operation of the bead transfer apparatus embodying the present invention. Prior to the start of operation, the power cylinder 20 on the stationary support structure 10 is maintained in a condition having the piston rod 22 projecting from the cylinder body so that the coupling unit 14 and accordingly the bead feed unit 12 are held in the respective first positions thereof as indicated by the full lines in FIG. 1. The bead feed unit 12 as a whole is thus spaced apart from the bead receiver unit 16 which is held in the previously mentioned predetermined uppermost position with respect to the bead feed unit 12. The lower coupling section 30 of the coupling unit 14 is held in an angular position having the bead feed unit 12 axially directed toward the bead receiver unit 16. The nut block 100 of each of the bead pressing assemblies 90 (FIG. 2) is maintained in the position engaging the bracket member 36, viz., remotest from the bead receiver unit 16 as shown in FIG. 2 so that the bead pressing elements 106 carried on the nut blocks 100 of the individual bead pressing assemblies 90 are located adjacent the longitudinal ends of the drum segments 74 remote from the bead receiver unit 16.

The nut blocks 68 and 68' of the feed drum 72 are assumed to be held in the positions remotest from each other on the feed shaft 52 so that the feed drum 72 has the previously mentioned maximum diameter thereof. Furthermore, the support column 112 of the bead receiver unit 16 is assumed to be held, about the axis of rotation thereof, in a position in which the bead transfer assembly including the disc member 114 and the annular casing 118 confront the bead feed unit 12.

Figure 7A:
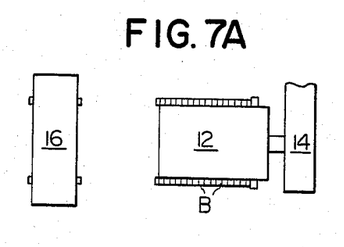
FIGS. 7A to 7F are schematic front elevation views showing various positions of the bead feed unit and bead receiver unit of the bead transfer apparatus in operation.

The operation of the bead transfer apparatus thus conditioned is initiated by loading the feed drum 72 with a set of bead cores. For this purpose, the reversible torque motor to drive the feed shaft 52 of the bead feed unit 12 is first actuated to drive the feed shaft 52 for rotation in a direction to cause the nut blocks 68 and 68' to move toward each other on the oppositely threaded portions 64 and 64', respectively, of the feed shaft 52. The power output of the motor is transmitted to the feed shaft 52 through the driving sprocket wheel on the output shaft of the motor, the endless chain passed between the driving sprocket wheel and the driven sprocket wheel 66 on the feed shaft 52. As the nut blocks 68 and 68' are driven to move closer to each other on and along the feed shaft 52, the link members 78 and 84 of one link assembly and the link members 78' and 84' of the other link assembly are caused to turn radially toward the hollow support shaft 32. The individual drum segments 74 of the feed drum 72 are thus caused to radially move toward the hollow support shaft 32 until the feed drum 72 as a whole is collapsed to a suitable diameter about the center axis of the feed shaft 52. After the feed drum 72 is collapsed to a desired diameter, the bead feed unit 12 as a whole is moved to turn about the axis of rotation of lower coupling section 30 of the coupling unit 14 in the direction indicated by the arrow c in FIG. 1 either manually or by any drive means which may be provided for the bead feed unit 12 if desired. The bead feed unit 12 as a whole is thus moved out of the position axially directed toward the bead receiver unit 16 and is ready to be loaded with bead cores. A desired number of bead cores B are now wrapped round the collapsed feed drum 72 either manually or automatically as shown in FIG. 7A of the drawings. Each of the bead cores B has an unvalcanized external layer and for this reason the loops of the individual bead cores B are caused to endwise stick to one another. Thus, the bead cores B wrapped round the feed drum 72 form a single, apparently integral tube. After the bead cores B are wrapped on the feed drum 72 in this manner, the motor for driving the feed shaft 52 is for a second time actuated to drive the feed shaft 52 in the opposite direction about the center axis thereof. This causes the nut blocks 68 and 68' to move away from each other on the threaded portions 64 and 64', respectively, of the feed shaft 52 so that the link members 78, 78', 84 and 84' are caused to turn away from the hollow support shaft 32. The individual drum segments 74 of the feed drum 72 are accordingly caused to radially move away from the support shaft 32 until the feed drum 72 as a whole is expanded to the previously mentioned predetermined maximum diameter about the center axis of the feed shaft 52.

Figure 7B:
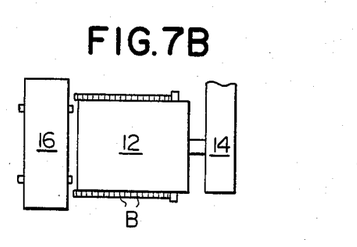

The feed drum 72 being thus expanded to the maximum diameter thereof, the bead cores B on the feed drum 72 are kept taut on and between the individual drum segments 74 and are thereby securely held on the feed drum 72. After the feed drum 72 is expanded as above described, the bead feed unit 12 as a whole is moved to turn about the axis of rotation of lower coupling section 30 of the coupling unit 14 in the direction indicated by the arrow d in FIG. 1 and is moved into the initial position axially directed toward the bead receiver unit 16. The power cylinder 20 connected to the coupling unit 14 is then actuated so that the piston rod 22 thereof is caused to retract, causing the coupling unit 14 to move from the first position indicated by the full lines to the second position indicated partly by the phantom lines in FIG. 1. The bead feed unit 12 as a whole is accordingly driven to move in the direction indicated by the arrow a from the first or rest position remote from the bead receiver unit 16 as indicated by the full lines to the second or operative position close to the bead receiver unit 16 as indicated by the phantom lines in FIG. 1. The tube of the bead cores B on the feed drum 72 has one of its opposite ends located in close proximity to the bead receiver unit 16 as will be seen from FIG. 7B of the drawings.

The power cylinder 20 is brought to a rest when the bead feed unit 12 as a whole reaches the second or operative position thereof. When the bead feed unit 12 reaches the particular position with respect to the bead receiver unit 16, the feed drum 72 of the bead feed unit 12 reaches an axial position in which the bead core located at the end of the feed drum 72 close to the bead receiver unit 16 is permitted to be transferred to the bead receiver unit 16. The particular axial position of the feed drum 72 with respect to the bead receiver unit 16 is such that the foremost ends of the drum segments 74 of the feed drum 72 are located on a vertical plane close or contiguous to the outer end face of the annular casing 118 facing the bead feed unit 12. The bead feed unit 12 being thus positioned with respect to the bead receiver unit 16, the center axis of the feed shaft 52 of the bead feed unit 12 is aligned with the respective center axes of the disc member 114, annular casing 118 and annular cam member 126 (FIGS. 4 to 6) of the bead transfer assembly positioned close to the bead feed unit 12. After the bead feed unit 12 is moved to the second predetermined position close to the bead receiver unit 16, the drive motor for the feed shaft 52 is actuated to drive the feed shaft 52 for rotation in the direction to cause the feed drum 72 to radially collapse so as to allow the bead cores on the feed drum 72 to slacken on and between the individual drum segments 74 of the feed drum 72.

By the time when the bead feed unit 12 is moved to the second or operative position close to the bead receiver unit 16 as above described, the power cylinder 140 having its piston rod 144 connected to the bracket member 138 on the annular cam member 126 is actuated to cause the piston rod 144 to retract upwardly in FIGS. 4 and 6. This causes the annular cam member 126 to turn clockwise in FIG. 6 about the center axis thereof with the result that the cam follower rollers 134 engaging the cam member 126 through the skewed radial guide slots 128 in the cam member 126 are forced to move radially inwardly through the guide slots 128. It therefore follows that the bead take-up elements 132 carrying the cam follower rollers 134 are caused to move radially inwardly through the radial guide slots 122 and 124 in the annular casing 118. The cam follower rollers 134 are thus finally located at the radially innermost ends of the skewed radial guide slots 128 in the annular cam member 126 and as a consequence the bead take-up elements 132 are located at the radially innermost ends of the radial guide slots 122 in the annular casing 118 as shown in FIG. 6. The slot 116 in the disc member 114 is provided to accommodate the movement of the bracket member 138 therein when the annular cam member 126 is driven to turn by means of the power cylinder 140.

After the bead feed unit 12 is moved to the position close to the bead receiver unit 16, the reversible torque motor to drive the screw shafts 92 of the bead pressing assemblies 90 is actuated to drive each of the screw shafts 92 for rotation in a direction to cause the nut block 100 to move on the screw shaft 92 from the position shown in FIG. 2 toward the bead receiver unit 16. The power output of the motor is transmitted to the screw shafts 92 through the driving sprocket wheel on the output shaft of the motor, the endless chain passed between the driving sprocket wheel and the driven sprocket wheels 98 on the screw shafts 92. As the nut blocks 100 of the bead pressing assemblies 90 are driven to move toward the bead receiver unit 16, the individual bead pressing elements 106 (FIG. 3) carried by the nut blocks 100 are brought into pressing engagement with the rearmost one of the bead cores on the feed drum 72, viz., the bead core located closest to the pressing elements 106 and force the integral tube of the bead cores toward the bead receiver unit 16. The integral tube of the bead cores on the feed drum 72 is therefore forced to axially move on the drum segments 74 toward the bead receiver unit 16 so that the foremost one of the bead cores is caused to depart from the feed drum 72. The bead core thus caused to depart from the feed drum 72 is, however, kept stuck to the adjacent bead core on the feed drum 72 and is not permitted to separate from the tube of the bead cores on the feed drum 72, still forming part of the initial tube of the bead cores. The particular bead core is located around the annular casing 118 of the bead receiver unit 16 since the feed drum 72 is held in the axial position closest to the bead receiver unit 16 with the foremost ends of the drum segments 74 of the feed drum 72 located on a vertical plane close or contiguous to the outer end face of the annular casing 118 facing the bead feed unit 12 as previously noted.

Figure 7C:
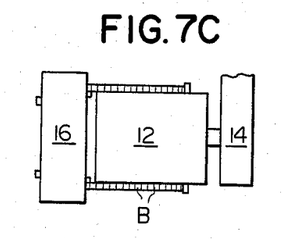

The power cylinder 140 is then actuated for the second time so as to cause the piston rod 144 to project downwardly in FIGS. 4 and 6. This causes the annular cam member 126 to turn in a counterclockwise direction in FIG. 6 about the center axis thereof with the result that the cam follower rollers 134 engaging the cam member 126 through the skewed radial guide slots 128 in the cam member 126 are forced to move radially outwardly through the guide slots 128. It therefore follows that the bead take-up elements 132 carrying the cam follower rollers 134 are caused to move radially outwardly through the radial guide slots 122 and 124 in the annular casing 118. When the cam follower rollers 134 reach the radially outermost ends of the skewed radial guide slots 128 in the annular cam member 126, the bead take-up elements 132 are located at the radially outermost ends of the radial guide slots 122 in the annular casing 118. The bead core which has been withdrawn from the feed drum 72 being located around the annular casing 118 as above discussed, the bead take-up elements 132 moved to the radially outermost ends of the radial guide slots 122 in the annular casing 118 have their respective lug portions brought into contact with the inner peripheral surface of the particular bead core. While the foremost one of the bead cores on the feed drum 72 is being thus received on the bead take-up elements 132 on the annular casing 118, the motor for the feed shaft 52 of the bead feed unit 12 is actuated to drive the feed shaft 52 for rotation in the direction to further expand the feed drum 72 until the feed drum 72 is expanded to the previously mentioned maximum diameter thereof. The bead cores received on the feed drum 72 are accordingly caused to stretch on and between the drum segments 74 and are thereby securely retained to the drum segments 74. FIG. 7C of the drawings shows these conditions of the bead feed unit 12 and bead receiver unit 16.

Figure 7D:
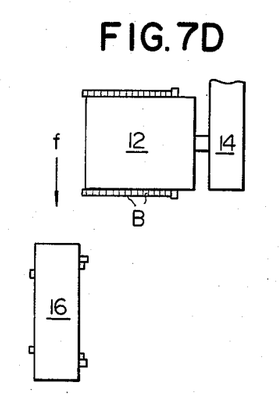
Figure 7E:
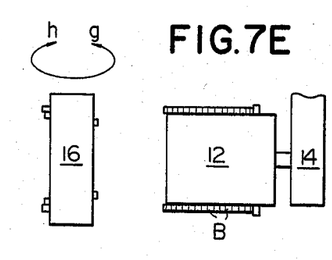
Figure 7F:
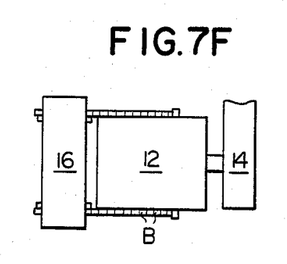

The drive unit 18 for the bead receiver unit 16 is now actuated to drive the support column 112 for downward movement so that the bead receiver unit 16 as a whole is driven to move a predetermined distance downwardly from the uppermost position thereof as indicated by the arrow f in FIG. 7D of the drawings. As a consequence, the bead core received on the lug portions of the bead take-up elements 132 on the annular casing 118 as above described is forced to depart from the tube of the remaining bead cores on the feed drum 72 by reason of a shearing stress produced between the particular bead core and the adjacent one of the remaining bead cores. It follows that the power cylinder 20 on the stationary support structure 10 is actuated to cause the piston rod 22 to project forwardly so that the bead feed unit 12 is driven to move in the direction indicated by the arrow b in FIG. 1 away from the bead receiver unit 16 back to the initial rest position indicated by the full lines in FIG. 1. The drive unit 18 is then actuated to drive the bead receiver unit 16 for upward movement until the bead receiver unit 16 resumes the initial uppermost position thereof with respect to the bead feed unit 12. The drive unit 18 is further actuated to drive the support column 112 for rotation through 180 degrees in the direction of the arrow g or h about the axis of rotation thereof so that the bead receiver unit 16 as a whole makes a half turn from the initial position about the axis of rotation of the support column 112 as indicated in FIG. 7E of the drawings. The annular casing 118 carrying the bead core B transferred from the feed drum 72 of the bead feed unit 12 is now turned over with respect to the bead feed unit 12 and the annular casing 118' which has been held in the position remoter from the bead feed unit 12 is held in a position facing the bead feed unit 12. All the procedures that have been carried out to transfer the foremost one of the bead cores on the feed drum 72 are thereafter repeated to transfer the subsequent one of the bead cores. After the second bead core is thus transferred from the bead feed unit 12 to the bead receiver unit 16, the two bead cores carried on the annular casings 118 and 118' of the bead receiver unit 16 are removed from the bead take-up elements 132 and 132', respectively, by means of suitable means (not shown) and are further transferred to a subsequent tire building station. The bead cores initially wrapped round the feed drum 72 of the bead feed unit 12 are in these manners transferred one by one to the bead receiver unit 16 as shown in FIG. 7F of the drawings by repetition of the cycles hereinbefore described.

What is claimed is:

1. A method of separating a bead core from a plurality of looped bead cores arranged in the form of a tube with the adjacent bead cores endwise sticking to one another with apparatus of the type including a movable bead feed unit and a movable bead receiver unit including spaced bead take-up elements, comprising the steps of wrapping said tube of the bead cores on a generally cylindrical feed drum which is radially collapsible about the center axis thereof, driving the bead feed unit for movement from a first predetermined position to a second predetermined position in a first predetermined direction substantially parallel with the center axis of the feed drum, pressing said tube of the bead cores on said feed drum toward one axial end of the feed drum until the foremost one of the bead cores on the feed drum departs from the feed drum, receiving said foremost one of the bead cores on the bead receiver unit positioned close to said axial end of the feed drum, driving the bead receiver unit together with said bead take-up elements for movement in a second predetermined direction substantilly perpendicular to said first direction with said bead take-up elements remaining fixed relative to one another and said bead receiver unit for thereby forcing the bead core received on said bead take-up elements on said bead receiver unit to separate from the tube of the remaining bead cores on said feed drum.

2. A method as set forth in claim 1, in which said tube of the bead cores is wrapped round said feed drum with the feed drum held in a radially collapsed condition and is transferred to said bead receiver unit with the feed drum held in a radially expanded condition.

3. A method as set forth in claim 2, in which said feed drum is radially collapsed after said bead feed unit is moved to said second predetermined position and is for the second time radially expanded after said foremost one of the tube of the bead cores on said feed drum is transferred to said bead receiver unit.

4. A method as set forth in claim 1, in which said second predetermined position of said bead feed unit is such that only one of the bead cores on said feed drum is permitted to withdraw from the feed drum to said bead receiver unit.

* * * * *